(12) United States Patent
Kamps

(10) Patent No.: US 12,055,204 B2
(45) Date of Patent: Aug. 6, 2024

(54) TRANSMISSION ELEMENT AND METHOD FOR PRODUCING A TRANSMISSION ELEMENT

(71) Applicant: Flender GmbH, Bocholt (DE)

(72) Inventor: Tobias Kamps, Munich (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 17/426,532

(22) PCT Filed: Feb. 11, 2020

(86) PCT No.: PCT/EP2020/053401
§ 371 (c)(1),
(2) Date: Jul. 28, 2021

(87) PCT Pub. No.: WO2020/165129
PCT Pub. Date: Aug. 20, 2020

(65) Prior Publication Data
US 2022/0042588 A1   Feb. 10, 2022

(30) Foreign Application Priority Data
Feb. 12, 2019   (EP) .................................... 19156632

(51) Int. Cl.
*B22F 10/28*   (2021.01)
*B33Y 80/00*   (2015.01)
(Continued)

(52) U.S. Cl.
CPC .............. *F16H 55/06* (2013.01); *B33Y 80/00* (2014.12); *F16H 55/17* (2013.01); *F16H 55/26* (2013.01);
(Continued)

(58) Field of Classification Search
CPC .......... F16H 55/06; F16H 55/17; F16H 55/26; B23K 26/342; B22F 10/28
See application file for complete search history.

(56) References Cited

U.S. PATENT DOCUMENTS 3,636,792 A    1/1972 Vigh
2004/0048711 A1    3/2004 Lev et al.
(Continued)

FOREIGN PATENT DOCUMENTS

CN    102459959    5/2012
CN    104428085    3/2015
(Continued)

OTHER PUBLICATIONS

International Search Report issued by the European Patent Office in International Application PCT/EP2020/053401 dated Apr. 27, 2020.
(Continued)

*Primary Examiner* — Monica A Huson
*Assistant Examiner* — Kelsey C Grace
(74) *Attorney, Agent, or Firm* — Henry M. Feiereisen LLC

(57) ABSTRACT

A toothed transmission element includes a partial region formed with a first material, teeth defining an edge region which is formed additively with a second material having a hardness which is greater than a hardness of the first material, and a third material located between the first material and the second material, wherein a hardness decreases stepwise along a section leading from the edge region to the partial region.

23 Claims, 1 Drawing Sheet

(51) Int. Cl.
  *F16H 55/06* (2006.01)
  *F16H 55/17* (2006.01)
  *F16H 55/26* (2006.01)
  *B23K 26/342* (2014.01)
  *B33Y 10/00* (2015.01)

(52) U.S. Cl.
  CPC ............. *B22F 10/28* (2021.01); *B23K 26/342* (2015.10); *B33Y 10/00* (2014.12)

(56) References Cited

U.S. PATENT DOCUMENTS

| | | | | |
|---|---|---|---|---|
| 2008/0152940 | A1* | 6/2008 | Kotthoff | B22F 3/164 266/249 |
| 2012/0132024 | A1* | 5/2012 | Mittermair | F16H 55/06 74/421 R |
| 2014/0007725 | A1* | 1/2014 | Enghels | C21D 1/42 219/640 |
| 2017/0211171 | A1* | 7/2017 | Domec | E21B 19/07 |
| 2017/0261087 | A1 | 9/2017 | White et al. | |
| 2018/0290712 | A1* | 10/2018 | Taniguchi | F16H 55/30 |

FOREIGN PATENT DOCUMENTS

| | | | |
|---|---|---|---|
| CN | 104864067 | | 8/2015 |
| CN | 107355526 | A | 11/2017 |
| CN | 108603261 | | 9/2018 |
| DE | 102011011242 | A1 | 8/2012 |
| DE | 102015005133 | | 10/2016 |
| EP | 1097778 | A2 | 5/2001 |
| EP | 1 887103 | A2 | 2/2008 |
| EP | 3078869 | A1 | 10/2016 |
| EP | 3378963 | A1 | 9/2018 |
| EP | 3403744 | A1 | 11/2018 |
| EP | 3483432 | A1 | 5/2019 |
| JP | H1046356 | A | 2/1998 |
| WO | WO 2014116254 | A1 | 7/2014 |

OTHER PUBLICATIONS

Chinese Search Report issued in Chinese Patent Application No. 2020800134688 dated Feb. 19, 2022.
Translation of Chinese Search Report issued in Chinese Patent Application No. 2020800134688 dated Feb. 19, 2022.
T. Sawa:"Correlation between Nanoindentation Test Results and Vickers Hardness" IMEKO 2010 TC3, TC5 and TC22 conferences; Metrology in Modern Context; Nov. 22-25, 2010, Pattaya Chonburi, Thailand; downloadbar bspw. unter https://www.imeko.org/publications/tc5-2010/IMEKO-TC5-2010-009.pdf.
Ausdruck der Webseite https://en.wikipedia.org/wiki/Mohs_scale_mineral_hardness Vom 13.12. 2022, zuletzt aktualisiert am 26. Nov. 2022.
Ausdruck der Webarchive-Seite https://web.archive.org/web/20170318002143/https://de.wikipedia.org/wiki/Titannitrid welche den Stand des Wikipedia-Artikels Titannitrid vom 18. März 2017 wiedergibt.
M. Bertau et al: "Industrielle Anorganische Chemie" vierte, vollständig überarbeitete und aktualisierte Auflage, 2013; ISBN 978-3-527-33019-5; Seite 623.
Audruck der Web Seite https://en.wikipedia.org/wiki/Hardness_of_the_elements_(data_page) vom 13.12. 2022, zuletzt aktualisiert am 24. Nov. 2022.
Audruck der Webarchiv-Seite https://web.archive.org/web/20170313195430/https://www.tf.uni-kiel.de/matwis/amat/mw1_ge/kap_8/advanced/t8_4_2.html welchen den Stand der Webseite https://www.tf.uni-kiel.de/matwis/amat/mw1_ge/kap_8/advanced/t8_4_2.html Vom 13. März 2017 wiedergibt.
Ausdruck vom 13.12. 2022 der Website https://www.samaterials.com/tungsten-carbide-nickel-powder-wc90-ni10.html (Stanford): TS3153 Tungsten Carbide-Nickel Powder (WC90-Ni10).
Ausdruck vom 13.12. 2022 der Website https://www.samaterials.com/chromium-carbide-nickel-chromium-powder.html (Stanford): CB3154 Chromium Carbide-Nickel Chromium Powder.
Wuyan Yuan et al: "A comparative study on microstructure and properties of traditional laser cladding and high-speed laser cladding of Ni45 alloy coatings", Surface and Coatings Technology vol. 405, Jan. 15, 2021, 126582 https://www.sciencedirect.com/science/article/pii/S0257897220312524.
Ausdruck der Webseite https://www.eziok.com/carbon-steel-properties vom 13.12. 2022 als ein Beispiel für einen "carbon steel".
Ausdruck der Webseite vom 13.12. 2022 https://kerschgens.stahl-lexikon.de/k/1882-kohlenstoffgehalt.html.
Ausdruck der Webseite vom 13.12. 2022 https://basedosteel.com/werkstoffe/werkstoff/10301.html.
Ausdruck der Webarchive-Seite https://web.archive.org/web/20190110142553/https://en.wikipedia.org/wiki/Carburizing welchen den Stand des Wikipedia-Artikels "Carburizing" vom 10. Jan. 2019 wiedergibt.
Ausdruck der Webarchive-Seite http:/web.archive.org/web/20170111053224/https://de.wikipedia.org/wiki/Auftragschwel%C3%9Fen welchen den Stand des Wikipedia-Artikels "Auftragschweißen" vom 11. Jan. 2017 wiedergibt.
Ausdruck der Webarchive-Seite https://web.archive.org/web/20170408215619/https://de.wikipedia.org/wiki/Laserauftragschwei%C3%9Fen welchen den Stand des Wikipedia-Artikels "Laserauftragschweißen" vom 8. Apr. 2017 wiedergibt.
Ausdruck der Webarchive-Seite https://web.archive.org/web/20181019231352/https://de.wikipedia.org/wiki/Zahnrad welchen den Stand des Wikipedia-Artikels "Zahnrad" vom 19. Oct. 2018 wiedergibt.
Ausdruck der Webarchive-Seite https://web.archive.org/web/20170902012350/https://www.twi-global.com/technical-knowledge/faqs/faq-what-is-hard-chrome-plating welchen den Stand der Webseite https://www.twi-global.com/technical-knowledge/faqs/faq-what-is-hard-chrome-plating vom 2. Sep. 2017 wiedergibt.
Ausdruck der Webarchive-Seite https://web.archive.org/web/20180506125716/https://de.wikipedia.org/wiki/Selektives_Laserschmelzen welchen den Stand des Wikipedia-Artikels "Selektives Laserschmelzen" vom 6. May 2018 wiedergibt.

* cited by examiner

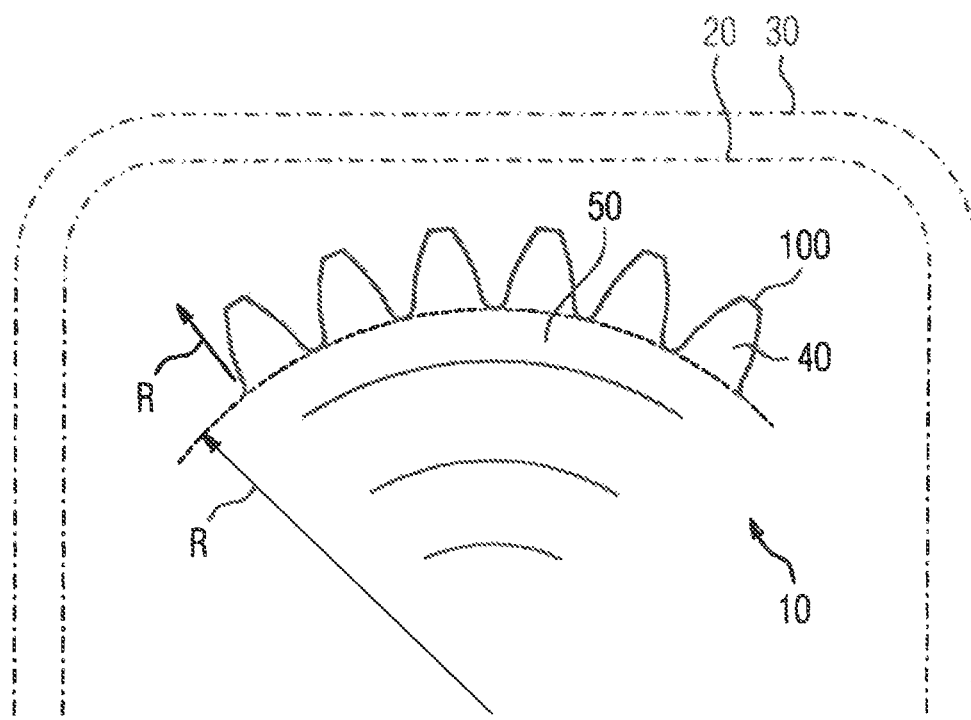

TRANSMISSION ELEMENT AND METHOD FOR PRODUCING A TRANSMISSION ELEMENT

CROSS-REFERENCES TO RELATED APPLICATIONS

This application is the U.S. National Stage of international Application No. PCT/EP2020/053401, filed Feb. 11, 2020, which designated the United States and has been published as International Publication No. WO 2020/165129 A1 and which claims the priority of European Patent Application, Serial No. 19156632.2, filed Feb. 12, 2019, pursuant to 35 U.S.C. 119(a)-(d).

BACKGROUND OF THE INVENTION

The invention relates to a transmission element and to a method for producing a transmission element and to a machine, in particular an electric machine, as well as to a transmission and a turbine.

Transmission elements such as, in particular, gearwheels and racks are subject to stringent requirements both with regard to their surface hardness and with regard to the ductility of their material internally. On the one hand, the surface hardness must be sufficiently high for the operation of a transmission element. At the same time, such transmission elements must have a sufficiently high ductility in their interior, that is to say in their core, to be able to compensate dynamic forces on the transmission element. At the same time, it is advantageous of the surface of the transmission element has internal compressive stresses. Such requirements exist particularly in the case of transmission elements of turbines and, in particular, electric machines.

The practice of producing the teeth of transmission elements from case-hardened steel and of increasing an otherwise low carbon content of the material by superficial carburization is known. The transmission element can then be hardened, thus ensuring that the transmission element has teeth with a particularly hard surface and is otherwise designed to be sufficiently soft, i.e. ductile. However, the series of processes for surface hardening is time-consuming, costly, energy-intensive and has an adverse effect on the environment owing to the use of process gases.

Alternatively, it is possible to carry out a complex chemical adaptation of the material and a heat treatment using case-hardened steels, or else to nitride transmission elements at the surface or to subject them to hardening of a peripheral layer by means of lasers or induction. However, these alternatives are limited in respect of their material properties, in particular their surface hardness or their hardness depth profile, and therefore such transmission elements cannot be used universally for high strength requirements.

It is therefore an object of the invention to specify a transmission element which, with respect to its material properties, can be used reliably in turbines and/or machines and which, at the same time, can be produced inexpensively and in a comparatively simple manner. It is furthermore an object of the invention to specify a method for producing such a transmission element which can be carried out reliably and inexpensively. In addition, it is the object of the invention to specify a machine and a turbine which have such a transmission element.

SUMMARY OF THE INVENTION

This object of the invention is achieved by a transmission element as set forth hereinafter, and by a method as set forth hereinafter, and by a transmission as set forth hereinafter, and by a machine as set forth hereinafter, and by a turbine as set forth hereinafter. Preferred developments of the invention are specified in the associated dependent claims, the following description and the drawing.

The transmission element according to the invention is toothed with teeth and has at least one partial region formed with a first material and at least one edge region formed additively with a second material. In the case of the transmission element according to the invention, the second material has a greater hardness than the first material, or else the second material has internal compressive stresses at a surface of the edge region as a result of its attachment to the first material, in particular as a result of the deviations of the structures of the first and the second material.

By virtue of the inexpensively achievable surface hardness of the edge region, the transmission element according to the invention advantageously has a considerably longer service life. Thus, the transmission element according to the invention can be used with significantly reduced maintenance costs and/or repair costs. At the same time, the first partial region can be formed with sufficiently ductile material, thus enabling the first partial region to perform a mechanical buffer function in order to compensate dynamic forces on the transmission element.

The transmission element according to the invention is suitable for inexpensive production by means of additive manufacturing using multi-axis or robot systems. According to the invention, the material properties can be designed to be graduated, thus ensuring the transmission element has a sufficiently high ductility in its interior by virtue of the first material. At the same time, the transmission element according to the invention can be made sufficiently hard, in particular brittle-hard, by virtue of the second material. By virtue of the production method, it is possible, in particular, for the brittle-hard/ductile material combination to be built up in a graduated manner, thus enabling a graduated hardening depth profile or an internal compressive stress gradient to be set. By virtue of the design of the transmission element as an additive workpiece, at least with regard to the second material, a large number of material combinations can be implemented. In particular, IN718 can be used as the first material, allowing the transmission element to be of particularly heat-resistant and ductile configuration in respect of the first material. As an additive workpiece, the transmission element according to the invention can have a graduated or stepped transition to a second material, in particular to one or more stellites and/or hard metals and/or intermetallic materials.

As an additive workpiece, the transmission element according to the invention can have special teeth of virtually any design at low cost.

Advantageously, the transmission element according to the invention can be produced inexpensively by means of the method according to the Invention by virtue of the additive production. In particular, significantly reduced fool costs are incurred. Moreover, according to the invention, reduced machine costs per hour can be achieved owing to the possibility in principle of using robots. According to the invention, set-up times can be considerably reduced. Advantageously, the transmission element according to the invention has a reduced production time, particularly in comparison with conventional production in the case of materials which are difficult to machine.

As a workpiece which is additive at least in respect of the second material, the transmission element according to the invention can be produced in an inexpensive way, particularly also in small batch sizes.

The difference in the Vickers hardness of the second material and the first material. In the transmission element according to the invention is preferably at least 100 HV, preferably at least 200 HV, and ideally at least 400 HV. The second material preferably has a Vickers hardness of at least 500 HV, preferably at least 600 HV, and preferably at least 700 HV, or even at least 780 HV, and/or the first material has a Vickers hardness of at most 400 HV, and preferably at most 350 HV.

By virtue of the easily achievable surface hardness, the transmission element according to the invention advantageously has a considerably longer service life. Thus, the transmission element according to the invention can be used with significantly reduced maintenance costs and/or repair costs. At the same time, the material of the first partial region can be made as ductile as desired within wide limits.

In the case of the transmission element according to the invention, at least one or more, preferably all, of the teeth expediently has or have the edge region formed additively with the second material. Advantageously, all the teeth are formed with the second material. In principle, however, a robust design of the transmission element according to the invention can be achieved even if only every second or every third or every nth tooth is formed with the second material.

As a particular preference, the transmission element according to the invention is formed with more than two materials, wherein the further materials expediently ensure a stepped or continuous increase in hardness from the first to the second material. The further materials are expediently located between the first and second materials. In the case of the transmission element according to the invention, one or more, preferably all, of the teeth ideally has or have the edge region formed additively with the second material. The transmission element according to the invention is preferably formed additively by means of one or more or all of these further materials.

In the case of the transmission element according to the invention, in addition, the partial region is preferably formed additively or, alternatively and likewise preferably, the partial region is formed by means of primary forming, preferably casting, forming, preferably forging, subtractively, in particular by machining.

In the last-mentioned development of the transmission element according to the invention, a core which is conventionally made from the first material can advantageously be used, thus enabling the transmission element according to the invention to be produced in a particularly inexpensive manner.

In the case of the transmission element according to the invention, the first material suitably has a higher ductility than the second material. The first material, and thus particularly the partial region, can therefore compensate dynamic forces on the transmission element.

The transmission element according to the invention is expediently a gearwheel or a rack or expediently has a gearwheel or a rack.

In the case of the transmission element according to the invention, the hardness decreases stepwise and/or continuously along a section leading from an edge region to the partial region, preferably at least by means of the first and the second material, preferably also by means of one or more further materials.

In the transmission element according to the invention, the first material is suitably formed with or from case-hardened steel and/or a nickel-based alloy.

In the case of the transmission element according to the invention, the second material is expediently formed with or from hard metal, preferably tungsten carbide, and/or a nickel-based alloy which preferably has long-term thermal stability at at least 250 degrees Celsius. According to the invention, in this development of the transmission element according to the Invention, a highly heat-resistant and brittle-hard material can be used as an additive workpiece for the second material.

In the case of the transmission element according to the invention, at least the second material is advantageously formed by means of laser deposition welding, in particular laser wire deposition welding or laser powder deposition welding, and/or by means of thermal spraying and/or by means of cold gas spraying and/or by means of arc deposition welding and/or by means of a powder bed process, in particular laser beam melting and/or selective laser melting and/or electron beam melting. By means of the above additive production methods, the second material of the transmission element can be printed in a particularly simple and inexpensive manner.

In the method according to the invention for producing a transmission element as described above, at least the second material Is formed, at least in the edge region, by means of laser deposition welding, in particular laser wire deposition welding, and/or thermal spraying and/or cold gas spraying and/or arc deposition welding and/or a powder bed process and/or selective laser melting. In principle, the first partial region can be formed with the first material in a conventional manner, i.e. by primary forming or forming or machining.

In principle, in the method according to the invention, final conventional and established hard finish machining steps can also be carried out in addition, thus allowing production with any desired degree of accuracy according to the invention.

The transmission according to the invention has at least one transmission element according to the invention as described above and/or as produced with the method according to the invention.

The machine according to the invention is, in particular, an electric machine, preferably a generator and/or a motor and/or electric motor. The machine according to the invention has a transmission according to the invention as described above.

The turbine according to the invention is, in particular, a wind turbine and/or a gas turbine and/or an aircraft gas turbine. The turbine according to the invention has a transmission according to the invention and/or a machine according to the invention as described above.

BRIEF DESCRIPTION OF THE DRAWING

The invention is explained in greater detail below with reference to an exemplary embodiment illustrated in the drawing.

The single FIG. 1 of the drawing shows a transmission element according to the invention in the form of a gearwheel schematically in a basic diagram in cross section.

DETAILED DESCRIPTION OF PREFERRED EMBODIMENTS

The transmission element according to the invention in the form of a gearwheel 10 which is illustrated in the drawing is part of an electric machine 20 according to the invention in the form of a generator of a wind turbine 30 according to the invention. In further exemplary embodiments, which are not specifically illustrated, the gearwheel 10 is part of a transmission of a gas turbine or of an aircraft gas turbine or of a motor and otherwise corresponds to the exemplary embodiment illustrated.

The gear wheel 10 is rotatable in the plane of the drawing of FIG. 1, i.e. about an axis of rotation (not explicitly shown) perpendicular to the plane of the drawing. As shown in FIG. 1, the gearwheel 10 is toothed with teeth 40 arranged on the outer circumference around this axis of rotation. The teeth 40 extend radially outward from a substantially circular gearwheel core 50, i.e. in the radial direction R.

According to the invention, the gearwheel 10 is formed as follows: First, the circular gearwheel core 50 is produced by means of primary forming, by means of casting in the exemplary embodiment illustrated. For this purpose, a nickel-based alloy is used in the exemplary embodiment shown. Alternatively, in further exemplary embodiments, which are not specifically illustrated, the gearwheel core 50 can be produced by means of forming, for example of case-hardened steel, or by means of subtractive production, for example by machining a block composed of a nickel-based alloy. The gearwheel core 50 forms a first partial region of the gearwheel 10, which is formed with a first material, a nickel-based alloy in the illustrated exemplary embodiment.

Teeth 40 are integrally formed on the gearwheel core 50 by means of an additive production method, being applied by means of additive production in the exemplary embodiment shown. For this purpose, the teeth 40 are printed onto the gearwheel core 50 by means of laser deposition welding of the hard metal, tungsten carbide in the exemplary embodiment shown.

In the illustrated exemplary embodiment, the teeth 40 form an edge region, which is formed with a second material, here as described tungsten carbide.

According to the invention, the second material has a Vickers hardness which differs by more than 500 degrees of hardness from the Vickers hardness of the first material. In this case, the second material is also subject to internal compressive stresses on the first material, which makes the second material particularly robust with respect to mechanical stresses.

In further exemplary embodiments, which are not specifically illustrated, the second material can be printed on by means of laser wire deposition welding or thermal spraying or arc deposition welding or by means of a powder bed process, in particular laser beam melting and/or electron beam melting. In the illustrated exemplary embodiment, the Vickers hardness of the second material is more than 800 HV, and the Vickers hardness of the first material is less than 300 HV.

In further exemplary embodiments, which are not specifically illustrated, the teeth 40 as a whole do not form the edge region, but only a radially outer region of the teeth 40 forms the edge region. The inner part of the teeth 40 is part of the gearwheel core 50, on which the outer region is printed.

In further exemplary embodiments, which are not specifically illustrated, not only two materials with Vickers hardnesses that differ from one another are used, but three or more materials are used whose differing Vickers hardnesses increase in the direction of the toothed edge 100 of the gearwheel 10, i.e. in the radial direction R.

For this purpose, it is possible, for example, to use a nickel-based alloy whose alloy components are modified in certain regions in such a way that the Vickers hardness of the respective regions increases with increasing proximity to the toothed edge of the gearwheel 10, that is to say in the radial direction R.

In further exemplary embodiments, the edge region is not formed, or is formed not only with or on teeth 40 arranged on the outer circumference, but with or on teeth arranged on the inner circumference. Instead of a gearwheel 10, a rack can be provided as a transmission element according to the invention in further exemplary embodiments which are not illustrated separately, the edge region being formed with or on a toothed edge of the rack.

It is self-evident that, in the abovementioned embodiments, the edge region need not necessarily be formed on or with all the teeth 40. On the contrary, the edge region can also be formed, for example, on or with every second or third or nth tooth 40.

The invention claimed is:

1. A toothed transmission element, comprising:
a partial region formed with a first material having a first Vickers hardness;
an edge region formed with a second material having a second Vickers hardness which is greater than the Vickers hardness of the first material, the edge region formed additively on the partial region; and
a third material having a third Vickers hardness located between the first material and the second material, wherein the Vickers hardnesses of the materials decrease stepwise in a radial direction along a section leading from the edge region to the partial region,
wherein a difference in the Vickers hardness of the second material and the Vickers hardness of the first material is at least 100, and the second material has a Vickers hardness of at least 500, and the first material has a Vickers hardness of at most 400 HV,
wherein the transmission element is constructed in the form of a gearwheel,
further comprising at least one or more teeth defining the edge region, wherein at least one or more of the teeth has or have the edge region formed additively with the second material,
and further comprising a circular gearwheel core radially inside the at least one or more teeth, wherein inner parts of the at least one or more teeth are part of the circular gearwheel core and the circular gearwheel core and inner parts of the at least one or more teeth are provided by machining.

2. The transmission element of claim 1, wherein the partial region is formed additively or the partial region is formed through primary forming, casting, forming, forging, subtractively, or by machining.

3. The transmission element of claim 1, wherein the first material has a ductility which is higher than a ductility of the second material or the second material has an internal compressive stress which is greater than the internal compressive stress of the first material.

4. The transmission element of claim 1, wherein the third material, between the first and second material is formed additively.

5. The transmission element of claim 1, wherein the first material is formed with or from case-hardened steel and/or nickel-based alloy.

6. The transmission element of claim 1, wherein the second material is formed with or from tungsten carbide, and/or a nickel-based alloy which has long-term thermal stability at at least 250 degrees Celsius.

7. The transmission element of claim 1, wherein at least the second material is formed by laser deposition welding, laser wire deposition welding or laser powder deposition welding, and/or thermal spraying and/or cold gas spraying and/or arc deposition welding and/or by a powder bed process, laser beam melting and/or selective laser melting and/or electron beam melting.

8. A method for producing a toothed transmission element constructed in the form of a gearwheel, said method comprising:
    forming a partial region with a first material having a first Vickers hardness, the partial region comprising a circular gearwheel core radially inside at least one or more teeth, wherein inner parts of the at least one or more teeth are part of the circular gearwheel core, and the circular gearwheel core and the inner parts of the at least one or more teeth are provided by machining;
    forming an edge region which is formed additively on the partial region, the edge region comprising the at least one or more teeth defining the edge region, with a second material by laser deposition welding, laser wire deposition welding, and/or thermal spraying and/or arc deposition welding and/or a powder bed process and/or selective laser melting, with the second material having a second Vickers hardness which is greater than the Vickers hardness of the first material; and
    forming a third material having a third Vickers hardness, the third material located between the first material and the second material, wherein the Vickers hardnesses of the materials decrease stepwise in a radial direction along a section leading from the edge region to the partial region,
    wherein a difference in the Vickers hardness of the second material and the Vickers hardness of the first material is at least 100, and the second material has a Vickers hardness of at least 500, and the first material has a Vickers hardness of at most 400 HV.

9. A transmission, comprising a transmission element as set forth in claim 1.

10. A machine, comprising a transmission as set forth in claim 9.

11. A turbine, comprising a transmission as set forth in claim 9 or an electric machine comprising said transmission.

12. The transmission element of claim 1, wherein the edge region provides an outer circumference of the transmission element.

13. The transmission element of claim 1, wherein the edge region provides an outer circumference of the at least one or more teeth.

14. The transmission element of claim 1, further comprising additional materials between the first and second materials.

15. The transmission element of claim 1, wherein the partial region forms an innermost region of the transmission element.

16. The transmission element of claim 1, wherein the partial region forms an innermost region of the transmission element and the edge region forms an outermost region of the transmission element.

17. The transmission element of claim 1, wherein the first material, the second material, and the third material are different materials.

18. The transmission element of claim 15, wherein the first material, the second material, and the third material are different distinguishable regions of different materials and different hardnesses.

19. The transmission element of claim 1, wherein the edge regions are formed by only a portion of the at least one or more teeth.

20. The transmission element of claim 1, wherein the partial region is formed by the circular gearwheel core.

21. The transmission element of claim 1, wherein the circular gearwheel core is provided by subtractive production.

22. The transmission element of claim 21, wherein the subtractive production is machining.

23. The transmission element of claim 1, wherein the edge region is formed by every nth tooth of the at least one or more teeth.

* * * * *